United States Patent
Saigo

(10) Patent No.: US 10,306,195 B2
(45) Date of Patent: May 28, 2019

(54) PROJECTOR, CONTROL METHOD OF PROJECTOR, AND PROGRAM

(71) Applicant: SEIKO EPSON CORPORATION, Tokyo (JP)

(72) Inventor: Manabu Saigo, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/301,477

(22) PCT Filed: Apr. 6, 2015

(86) PCT No.: PCT/JP2015/001930
§ 371 (c)(1),
(2) Date: Oct. 3, 2016

(87) PCT Pub. No.: WO2015/155980
PCT Pub. Date: Oct. 15, 2015

(65) Prior Publication Data
US 2017/0034491 A1 Feb. 2, 2017

(30) Foreign Application Priority Data
Apr. 8, 2014 (JP) ................. 2014-079123

(51) Int. Cl.
*H04N 9/31* (2006.01)
*G09G 3/00* (2006.01)
*G06F 3/0484* (2013.01)
*G06T 7/00* (2017.01)
(Continued)

(52) U.S. Cl.
CPC ....... *H04N 9/3185* (2013.01); *G06F 3/04847* (2013.01); *G06T 3/005* (2013.01);
(Continued)

(58) Field of Classification Search
CPC .......... H04N 9/31; H04N 9/3185; H04N 3/23; G06T 7/00; G06T 7/002; G06F 3/0484; G06F 3/04883
(Continued)

(56) References Cited

U.S. PATENT DOCUMENTS 7,857,461 B2 * 12/2010 Kondo ................ H04N 5/74
353/121
8,941,785 B2 * 1/2015 Saigo ................. H04N 9/3185
348/607
(Continued)

FOREIGN PATENT DOCUMENTS

JP 2004-320662 A 11/2004
JP 2008-092012 A 4/2008
(Continued)

OTHER PUBLICATIONS

Panasonic Operating Instructions Functional Manual, Model No. PT-DZ21KE.
(Continued)

*Primary Examiner* — Trang U Tran
(74) *Attorney, Agent, or Firm* — Oliff PLC

(57) ABSTRACT

A method of geometric correction can be designated by an intuitive and simple operation, with respect to a projected image projected by a projector. The projector includes a projection unit that projects an image on a projection target, and a correction unit that performs the geometric correction of a projected image projected by the projection unit, based on a deformation amount in a predetermined direction and deviation of the deformation amount in the predetermined direction with respect to the projection target.

12 Claims, 9 Drawing Sheets

(51) Int. Cl.
*G06T 3/00* (2006.01)
*G06T 5/00* (2006.01)
*G06F 3/0488* (2013.01)

(52) U.S. Cl.
CPC ............ *G06T 5/006* (2013.01); *G06T 7/0002* (2013.01); *G09G 3/002* (2013.01); *G06F 3/04883* (2013.01); *G09G 2340/14* (2013.01); *G09G 2370/12* (2013.01)

(58) Field of Classification Search
USPC ....... 348/745–747, 734; 353/69, 70, 28, 121
See application file for complete search history.

(56) References Cited

U.S. PATENT DOCUMENTS

| | | |
|---|---|---|
| 9,478,053 B2 * | 10/2016 | Yoshimura ........... H04N 9/3185 |
| 2004/0257366 A1 | 12/2004 | Moriwaki et al. |
| 2013/0083298 A1 | 4/2013 | Yoshimura et al. |

FOREIGN PATENT DOCUMENTS

| | | |
|---|---|---|
| JP | 2009-005148 A | 1/2009 |
| JP | 2012-230302 A | 11/2012 |
| JP | 2013-077958 A | 4/2013 |

OTHER PUBLICATIONS

Jun. 2, 2015 Search Report issued in International Patent Application No. PCT/JP2015/001930.

* cited by examiner

| | | MOVEMENT DESTINATION COORDINATES    LENS SHIFT AMOUNT a:b = 5:5 | | | | | | | |
|---|---|---|---|---|---|---|---|---|---|
| | | x0,y0 | x1,y1 | x2,y2 | x3,y3 | x4,y4 | x5,y5 | x6,y6 | x7,y7 |
| CONCAVE ↑ | 0.1 | x0(0.1),y0(0.1) | x1(0.1),y1(0.1) | x2(0.1),y2(0.1) | x3(0.1),y3(0.1) | x4(0.1),y4(0.1) | x5(0.1),y5(0.1) | x6(0.1),y6(0.1) | x7(0.1),y7(0.1) |
| | 0.3 | x0(0.3),y0(0.3) | x1(0.3),y1(0.3) | x2(0.3),y2(0.3) | x3(0.3),y3(0.3) | x4(0.3),y4(0.3) | x5(0.3),y5(0.3) | x6(0.3),y6(0.3) | x7(0.3),y7(0.3) |
| | 0.5 | | | | | ... | | | |
| | 0.7 | | | | | | | | |
| | 0.9 | | | | | | | | |
| | 1.1 | | | | | | | | |
| | 1.3 | | | | | | | | |
| | 1.5 | | | | | | | | |
| | 1.7 | x0(1.7),y0(1.7) | x1(1.7),y1(1.7) | x2(1.7),y2(1.7) | x3(1.7),y3(1.7) | x4(1.7),y4(1.7) | x5(1.7),y5(1.7) | x6(1.7),y6(1.7) | x7(1.7),y7(1.7) |
| | 1.9 | x0(1.9),y0(1.9) | x1(1.9),y1(1.9) | x2(1.9),y2(1.9) | x3(1.9),y3(1.9) | x4(1.9),y4(1.9) | x5(1.9),y5(1.9) | x6(1.9),y6(1.9) | x7(1.9),y7(1.9) |
| R/L | FLAT | X0,Y0 | X1,Y1 | X2,Y2 | X3,Y3 | X4,Y4 | X5,Y5 | X6,Y6 | X7,Y7 |
| | -1.9 | x0(-1.9),y0(-1.9) | x1(-1.9),y1(-1.9) | x2(-1.9),y2(-1.9) | x3(-1.9),y3(-1.9) | x4(-1.9),y4(-1.9) | x5(-1.9),y5(-1.9) | x6(-1.9),y6(-1.9) | x7(-1.9),y7(-1.9) |
| | -1.7 | x0(-1.7),y0(-1.7) | x1(-1.7),y1(-1.7) | x2(-1.7),y2(-1.7) | x3(-1.7),y3(-1.7) | x4(-1.7),y4(-1.7) | x5(-1.7),y5(-1.7) | x6(-1.7),y6(-1.7) | x7(-1.7),y7(-1.7) |
| | -1.5 | | | | | ... | | | |
| | -1.3 | | | | | | | | |
| | -1.1 | | | | | | | | |
| | -0.9 | | | | | | | | |
| | -0.7 | | | | | | | | |
| | -0.5 | | | | | | | | |
| | -0.3 | x0(-0.3),y0(-0.3) | x1(-0.3),y1(-0.3) | x2(-0.3),y2(-0.3) | x3(-0.3),y3(-0.3) | x4(-0.3),y4(-0.3) | x5(-0.3),y5(-0.3) | x6(-0.3),y6(-0.3) | x7(-0.3),y7(-0.3) |
| CONVEX ↓ | -0.1 | x0(-0.1),y0(-0.1) | x1(-0.1),y1(-0.1) | x2(-0.1),y2(-0.1) | x3(-0.1),y3(-0.1) | x4(-0.1),y4(-0.1) | x5(-0.1),y5(-0.1) | x6(-0.1),y6(-0.1) | x7(-0.1),y7(-0.1) |

CONCAVE

FLAT  L/R

CONVEX

PROJECTOR, CONTROL METHOD OF PROJECTOR, AND PROGRAM

CROSS REFERENCE TO RELATED APPLICATIONS

The entire disclosure of Japanese Patent Application No. 2014-079123, filed Apr. 8, 2014 is expressly incorporated by reference herein.

BACKGROUND

1. Technical Field

The present invention relates to a projector, a control method of the projector, and a program.

2. Related Art

A projector that performs geometric correction processing for deforming a projected image is known. As a typical example of the geometric correction processing, trapezoidal distortion correction (keystone correction) is known (for example, see JP-A-2008-92012). In the projector of PTL 1, geometric correction is performed in accordance with the movement of a correction point when an operation is performed by a remote controller such that a plurality of correction points set in the projected image are moved.

In a case where the geometric correction is performed, as a method of instructing a method of correction, similar to the correction point used in PTL 1, a method for performing an operation of moving a representative point is general. However, a work for instructing a movement distance or movement direction of the representative point one by one requires time and effort. For example, in a case where a projection surface on which an image is projected by the projector is curved and distortion of the projected image due to the curvature of the projection surface is corrected, it is necessary to move the representative point in consideration of a state of complex distortion. Therefore, a method for simply designating a method of the geometric correction by a more intuitive operation is required.

An object of the invention made in view of the circumstances described above is to designate the method of the geometric correction by an intuitive and simple operation, with respect to the projected image of the projector.

SUMMARY

In order to achieve the object, a projector according to the invention includes a projection unit that projects an image on a projection target; and a correction unit that performs geometric correction on a projected image of the projection unit, based on a deformation amount in a predetermined direction and deviation of the deformation amount in the predetermined direction, with respect to the projection target.

According to the invention, the geometric correction of the projected image is performed by designating a deformation amount and deviation of the deformation amount that are one-dimensional amount or number. Therefore, a user can simply designate a desired method of geometric correction, by an intuitive operation.

In addition, according to the invention, the projector further includes an operation unit that receives designation of the deformation amount in the predetermined direction and the deviation of the deformation amount in the predetermined direction, with respect to the projection target.

According to the invention, it is possible to designate the deformation amount and the deviation of the deformation amount determining the method of the geometric correction by an operation with respect to the projector.

In addition, according to the invention, in the projector, the projection unit projects a user interface for receiving the designation of the deformation amount and the deviation.

According to the invention, it is possible to designate the method of the geometric correction of the projected image, by instructing the deformation amount in the predetermined direction and the deviation of the deformation amount in the predetermined direction with respect to the projection target by using a user interface. Since the deformation amount and the deviation of the deformation amount to be a target of the operation are one-dimensional amount or number, in a case where the geometric correction is performed on the projected image based on an operation of the user interface, correspondence between a shape change and an operation content of the projected image is clear, and easy to understand. Accordingly, it is possible to perform the intuitive operation, and simply designate the desired method of the geometric correction.

In addition, according to the invention, in the projector, the user interface includes a first user interface for instructing the deformation amount, and a second user interface for instructing the deviation.

According to the invention, it is possible to simply designate each of the deformation amount in the predetermined direction and the deviation of the deformation amount in the predetermined direction with respect to the projection target.

In addition, according to the invention, in the projector, at least any one of the first and the second user interfaces is a slide bar type interface.

According to the invention, it is possible to designate the method of geometric correction by a more intuitive and simple operation.

In addition, according to the invention, in the projector, the user interface includes a third user interface for instructing a deformation amount in a second direction perpendicular to the predetermined direction, and the correction unit performs the geometric correction in the second direction, in response to an operation of the third user interface.

According to the invention, it is possible to designate the method of the geometric correction by an intuitive and simple operation with respect to the second direction perpendicular to the predetermined direction, in addition to the geometric correction in the predetermined direction of the projection target.

In addition, according to the invention, in the projector, the correction unit deforms the projected image to be convex or concave in the predetermined direction of the projection target.

According to the invention, when an image is projected on a curved screen having a convex surface or a concave surface, the geometric correction on the projected image can be appropriately performed.

In addition, according to the invention, in the projector, the correction unit corrects the projected image of the projection unit, based on a distance between a cylindrical surface in a case where the projection target is considered as the cylindrical surface and the projection unit, and a radius of the cylindrical surface.

According to the invention, in a case where the projection target has a curvature of the cylindrical surface shape and the distortion of the projected image due to the curvature is generated, it is possible to correct the distortion of the projected image by a simple operation.

In addition, according to the invention, in the projector, the correction unit corrects the projected image of the projection unit, based on a distance between a cylindrical surface in a case where a side of the projection target opposite to the projection unit is considered as a convex or concave cylindrical surface and the projection unit, and the radius of the cylindrical surface.

According to the invention, in a case where the projection target has a curvature of the cylindrical surface shape and the distortion of the projected image due to the curvature is generated, it is possible to correct the distortion of the projected image based on small parameter. Therefore, a user may designate a small number of parameters, and can correct the distortion by a simple operation.

In addition, according to the invention, in the projector, the correction unit performs correction in the second direction, based on the deformation amount in the second direction perpendicular to the predetermined direction.

According to the invention, it is possible to designate the method of the geometric correction by an intuitive and simple operation with respect to the second direction perpendicular to the predetermined direction, in addition to the geometric correction in the predetermined direction of the projection target.

In addition, according to the invention, in the projector, the correction unit corrects the projected image of the projection unit in the second direction, based on a slope of an optical axis of the projection unit with respect to a horizontal direction.

According to the invention, it is possible to correct the distortion due to the slope of the optical axis with respect to the projection target by deforming the projected image in the second direction.

In addition, in order to achieve the object, a control method of a projector that projects an image on a projection target according to the invention includes performing geometric correction of a projected image, based on a deformation amount in a predetermined direction and deviation of the deformation amount in the predetermined direction with respect to the projection target.

According to the invention, it is possible to perform the geometric correction of the projected image, based on the deformation amount and the deviation of the deformation amount that are one-dimensional amount or number to be able to be intuitively inputted.

In addition, according to the invention, the control method of the projector further includes performing the geometric correction of the projected image, by receiving designation of the deformation amount in the predetermined direction and the deviation of the deformation amount in the predetermined direction with respect to the projection target, based on the received deformation amount in the predetermined direction and the received deviation of the deformation amount in the predetermined direction with respect to the projection target.

According to the invention, by receiving designation of the deformation amount and the deviation of the deformation amount by the user, since the geometric correction of the projected image is performed, the user can simply designate the desired method of geometric correction.

In addition, in order to achieve the object, a program executable by a computer for controlling a projector that projects an image on a projection target according to the invention causes the computer to execute performing geometric correction of a projected image based on a deformation amount in a predetermined direction and deviation of the deformation amount in the predetermined direction with respect to the projection target.

By causing the computer to execute the program according to the invention, it is possible to perform the geometric correction of the projected image, based on the deformation amount and the deviation of the deformation amount that are one-dimensional amount or number to be able to intuitively inputted.

In addition, according to the invention, the program causes the computer to further execute performing the geometric correction of the projected image, by receiving designation of the deformation amount in the predetermined direction and the deviation of the deformation amount in the predetermined direction with respect to the projection target, based on the received deformation amount in the predetermined direction and the received deviation of the deformation amount in the predetermined direction with respect to the projection target.

By causing the computer to execute the program of the invention, the designation of the deformation amount and the deviation of the deformation amount is received by the user and the geometric correction of the projected image is performed such that the user can simply designate the desired method of the geometric correction.

ADVANTAGEOUS EFFECTS OF INVENTION

According to the invention, a user can perform the geometric correction of the projected image, by an intuitive and simple operation.

BRIEF DESCRIPTION OF DRAWINGS

FIG. 7 is a diagram illustrating an example of a movement destination coordinate table used in the geometric correction processing.

DESCRIPTION OF EMBODIMENTS

Hereinafter, with reference to the drawings, an embodiment to which the invention is applied will be described.

Figure 1:
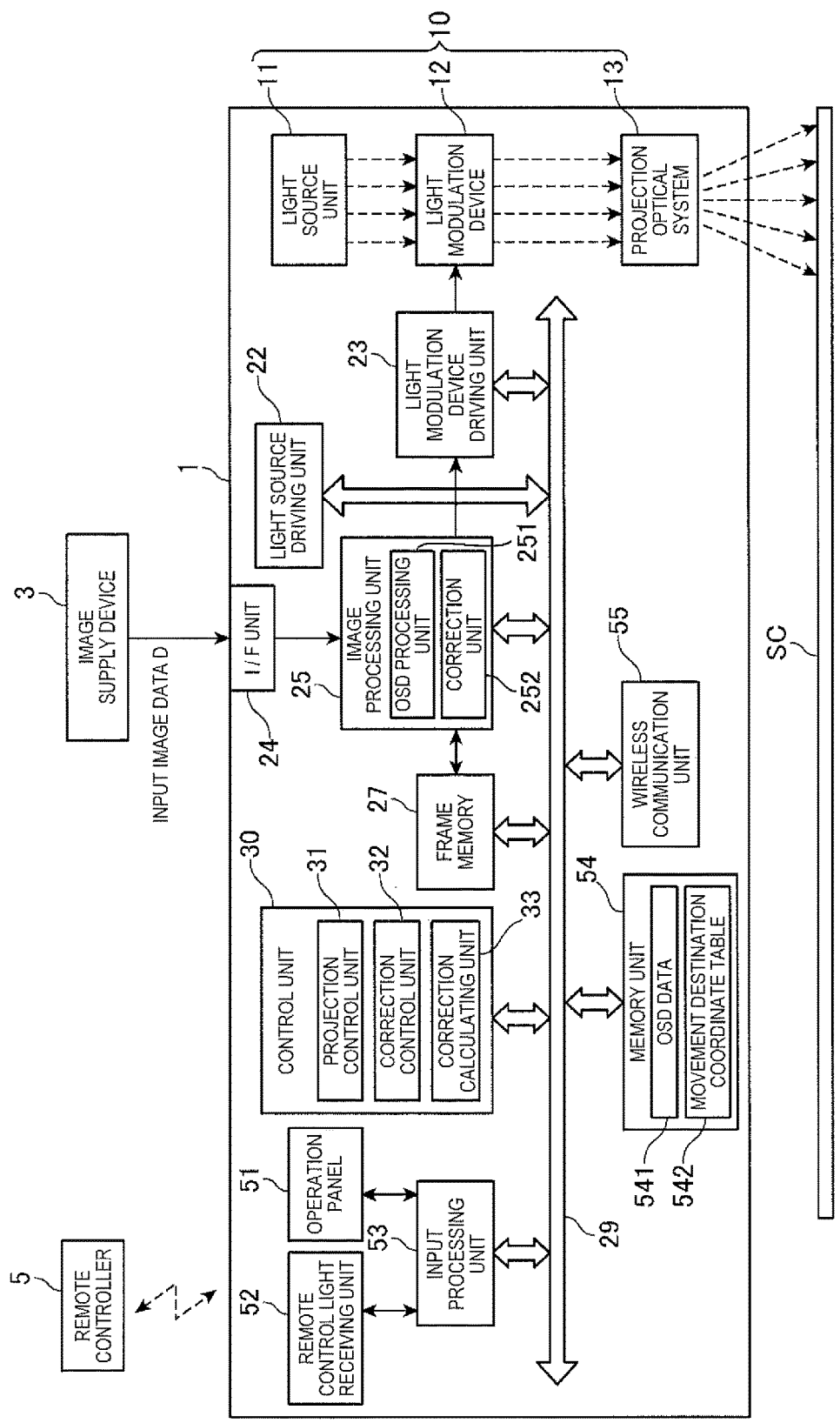
FIG. 1 is a block diagram of a projector according to an embodiment.

FIG. 1 is a block diagram of a projector 1 according to the embodiment.

The projector 1 is connected to an external image supply device 3 such as a personal computer, various video players, and the like, and a device that projects an image on a target object (projection target) based on input image data D received from the image supply device 3. As the image supply device 3, a video playback device, a digital versatile disk (DVD) playback device, a TV tuner device, a set-top box of a cable television (CATV), a video output device such as a video game apparatus and the like, the personal computer, or the like is mentioned. In addition, the target object may be an object not uniformly flat such as buildings, objects, and the like, and may be an object having a flat projection surface such as a screen SC, a wall of a building, and the like. In the embodiment, a case where an image is projected on the screen SC as the projection target is exemplified. The screen SC is a plane surface or a curved surface, as described below.

The projector 1 includes an interface (I/F) unit 24, as the interface connected to the image supply device 3. For example, a DVI interface, a USB interface, a LAN interface, or the like for receiving a digital image signal can be used in the I/F unit 24. In addition, for example, an S video terminal for receiving a composite video signal such as NTSC, PAL, SECAM, and the like, an RCA terminal for receiving the composite video signal, a D terminal for receiving a component video signal, or the like can be used in the I/F unit 24. Furthermore, the general purpose interface such as a HDMI connector or the like that complies to the HDMI (trade mark) standard can be used in the I/F unit 24. In addition, the I/F unit 24 may be set with a configuration including an A/D conversion circuit that converts an analog video signal into digital image data, and connected to the image supply device 3 by the analog video terminal such as a VGA terminal and the like. The I/F unit 24 may perform transmission and reception of an image signal by a wired communication, and may perform transmission and reception of an image signal by a wireless communication.

The projector 1 includes a projection unit 10 that performs formation of an optical image, and an image processing system that electrically processes an image displayed by the projection unit 10, by greatly dividing the projector. First, the projection unit 10 will be described.

The projection unit 10 includes a light source unit 11, a light modulation device 12, and a projection optical system 13.

The light source unit 11 includes a light source such as a xenon lamp, an extra high pressure mercury lamp, a light emitting diode (LED), and the like. In addition, the light source unit 11 may include a reflector and an auxiliary reflector that guide light emitted by the light source to the light modulation device 12. In addition, the light source unit 11 may include a lens group for increasing the optical characteristics of the projection light, a polarizer, a dimming element or the like for lowering the amount of the light emitted by the light source on a path reaching the light modulation device 12, or the like (all not illustrated).

The light modulation device 12 corresponds to a modulation unit that modulates the light emitted from the light source unit 11 based on image data. The light modulation device 12 is configured by using the liquid crystal panel. The light modulation device 12 includes a transmissive liquid crystal panel in which a plurality of pixels are disposed in a matrix shape, forms an image by the plurality of pixels, and modulates the light emitted by the light source according to the formed image. The light modulation device 12 is driven by a light modulation device driving unit 23, and forms the image by changing the transmittance of the light in each pixel disposed in the matrix shape.

The projection optical system 13 includes a zoom lens for performing the enlargement or reduction and adjustment of focus of the image to be projected, a focus adjustment mechanism for performing adjustment of the focus, or the like. The projection optical system 13 forms an image by projecting the image light modulated in the light modulation device 12 on the target object.

A light source driving unit 22 and the light modulation device driving unit 23 are connected to the projection unit 10.

The light source driving unit 22 drives the light source included in the light source unit 11 according to control of a control unit 30. The light modulation device driving unit 23 drives the light modulation device 12 according to the image signal received from an image processing unit 25 described below, according to the control of the control unit 30, and draws an image on the liquid crystal panel.

The image processing system of the projector 1 is configured around the control unit 30 that controls the projector 1. The projector 1 includes a memory unit 54 in which data processed by the control unit 30 or a control program executed by the control unit 30 is stored. In addition, the projector 1 includes a remote control light receiving unit 52 that detects an operation by the remote controller 5, and includes an input processing unit 53 that detects an operation through an operation panel 51 and the remote control light receiving unit 52.

The memory unit 54 is a non-volatile memory such as a flash memory, EEPROM, and the like.

The control unit 30 is configured by including a central processing unit (CPU), a read only memory (ROM), a random access memory (RAM), or the like not illustrated. The control unit 30 controls the projector 1, by executing a basic control program stored in the ROM and a control program stored in the memory unit 54 by the CPU. In addition, the control unit 30 performs functions of a projection control unit 31, a correction control unit 32, and a correction calculating unit 33, by executing the control program stored in the memory unit 54.

The operation panel 51 in which various switches and indicator lamps for performing an operation by users are provided is disposed in the main body of the projector 1. The operation panel 51 is connected to the input processing unit 53. The input processing unit 53 appropriately turns on or off an indicator lamp of the operation panel 51 according to an operation state or a setting state of the projector 1, in accordance with control of the control unit 30. When the switch of the operation panel 51 is operated, an operation signal corresponding to the operated switch is output from the input processing unit 53 to the control unit 30.

In addition, the projector 1 includes the remote controller 5 used by users. The remote controller 5 includes various buttons, and transmits an infrared signal corresponding to an operation of these buttons. In the main body of the projector 1, the remote control light receiving unit 52 that receives the infrared signal emitted by the remote controller 5 is disposed. The remote control light receiving unit 52 generates an operation signal indicating an operation content in the remote controller 5 by decoding the infrared signal received from the remote controller 5, and outputs the generated signal to the control unit 30.

The image processing unit 25 obtains the input image data D in accordance with the control of the control unit 30, and determines attributes such as an image size, resolution, the image being a still image or a moving image, and a frame rate in a case of the image being the moving image, with respect to the input image data D. The image processing unit 25 draws the image based on the input image data D in a frame memory 27, and performs image processing with respect to the drawn image. The image processing unit 25 reads the image after processing from the frame memory, generates image signals of R, G, and B corresponding to the image, and outputs the generated signals to the light modulation device driving unit 23.

Processing performed by the image processing unit 25, for example, is resolution conversion processing, digital zoom processing, color correction processing, brightness correction processing, or the like. The image processing unit 25 performs processing designated by the control unit 30, and performs processing by using parameters received from the control unit 30, if necessary. In addition, it is also possible to perform processing by combining the above plurality of pieces of processing.

In addition, the image processing unit 25 includes an OSD processing unit 251 and a correction unit 252.

The OSD processing unit 251 performs processing combined by overlapping another image with the image based on the input image data D, in accordance with the control of the control unit 30, and generates the OSD image. The projection unit 10 projects the OSD image generated by the OSD processing unit 251. For example, the OSD processing unit 251 reads OSD data 541 stored in advance in the memory unit 54, by the control of the control unit 30, and overlaps the read data with the image based on the input image data D.

The OSD data 541 is an image constituting a menu screen for performing a setting according to a function of the projector 1 or an image constituting a user interface 120 (FIG. 4) described below. In a case where the menu screen or the user interface 120 is projected as the OSD image by the function of the OSD processing unit 251, it is possible to perform various settings by an operation of the remote controller 5 or the operation panel 51.

In addition, the correction unit 252 performs the geometric correction processing for deforming the projected image of the projection unit 10, in accordance with the control of the control unit 30. The correction unit 252 performs processing for deforming the image drawn in the frame memory 27, based on the parameters received from the control unit 30. Specifically, coordinates after the deformation with respect to each of pixels constituting the image based on the input image data D are specified, the image after the deformation is generate by converting the coordinates of each pixel, and the generated image is output to the light modulation device driving unit 23. A functional unit corresponding to the correction unit of the invention may be also set as the correction unit 252, and may be also set as the correction control unit 32 of the control unit 30 and as a combination of the correction calculating unit 33 and the correction unit 252.

In addition, the projector 1 includes a wireless communication unit 55. The wireless communication unit 55 includes an antenna, a radio frequency (RF) circuit, or the like not described, and performs wireless communication with an external device under the control of the control unit 30. For example, a wireless communication method of the wireless communication unit 55 can adopt a short-range wireless communication method such as the local area network (LAN), the Bluetooth (registered trade), the ultra wide band (UWB), the infrared communication, and the like, or a wireless communication method using a mobile phone line.

The projection control unit 31 projects the image based on the input image data D to the target object, by controlling the light source driving unit 22, the light modulation device driving unit 23, and the image processing unit 25.

For example, the correction control unit 32 detects the instruction of the geometric correction processing by the input processing unit 53 through the remote controller 5 or the operation panel 51. In a case where operation data indicating the instruction of the geometric correction processing is input, the correction control unit 32 outputs an instruction indicating the OSD data 541 of the user interface for the geometric correction as the OSD image, with respect to the OSD processing unit 251. Here, in a case where the OSD data 541 includes a plurality of pieces of image data, the correction control unit 32 may designate the image data to be used among the image data including the OSD data 541. In addition, the correction control unit 32 may output image data to the OSD processing unit 251 by obtaining the image data of the OSD image to be used, from the memory unit 54. In addition, the correction control unit 32 may output the OSD data 541 to the OSD processing unit 251, by controlling the memory unit 54. The OSD data 541 that is output by the correction control unit 32 is data of the user interface 120 described below.

The correction control unit 32 obtains and analyzes operation content, in a case where a user operates the remote controller 5 or the operation panel 51, in a state where the user interface 120 is projected by the projection unit 10. The correction control unit 32 performs calculation processing by sending an amount received by using the user interface 120 to the correction calculating unit 33.

The correction calculating unit 33 performs calculation processing for deforming a target image of the geometric correction, based on the amount received by using the user interface 120. Accordingly, the correction calculating unit 33 outputs a table obtained by the calculation processing to the image processing unit 25, and performs the geometric correction of the image of the frame memory 27 by controlling the correction unit 252.

As described above, the correction control unit 32 and the correction calculating unit 33 are realized as software, by executing the program by the CPU constituting the control unit 30. Meanwhile, for example, the image processing unit 25 can be configured as a system-on-a-chip (SoC)-field-programmable gate array (FPGA) having image processing function. In this case, the OSD processing unit 251 and the correction unit 252 are realized by a digital signal processor (DSP) or the like mounted on the SoC. In addition, the frame memory 27 is configured by a semiconductor memory element such as a dynamic random access memory (DRAM) and the like. In FIG. 1, a configuration in which the frame memory 27 is externally connected to the image processing unit 25 is exemplified. However, it is also possible to implement a configuration in which the frame memory 27 is mounted on the SOC constituting the image processing unit 25. The functional unit that performs the geometric correction processing in the projector 1 may be implemented as the functional unit realized by software, and may be implemented as the functional unit realized by hardware. The embodiment is only an example.

Here, a specific example of the geometric correction performed by the projector 1 will be described.

FIG. 2 illustrates diagrams illustrating an example of distortion of a projected image to be a target of geometric correction processing. FIG. 2(a) is a schematic plan view illustrating a state where the projector 1 is projected on a plane screen SC. FIGS. 2(b) and 2(c) are schematic plan views illustrating a state where the projector 1 is projected on curved screens SC1 and SC2. The projected images in states of FIGS. 2(a), 2(b), and 2(c) are illustrated in FIGS. 2(d), 2(e), and 2(f). In addition, in FIGS. 2(d), 2(e), and 2(f), a vertical direction in the screen SC, SC1, and SC2 is illustrated as an arrow of a symbol V, and a horizontal direction is illustrated as an arrow of a figure symbol H.

Figure 2A:
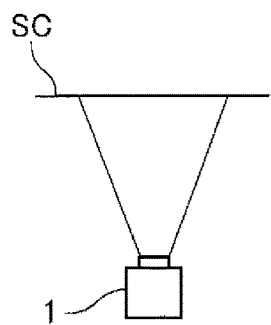
FIG. 2 illustrates diagrams illustrating an example of distortion of a projected image to be a target of geometric correction processing.
Figure 2D:
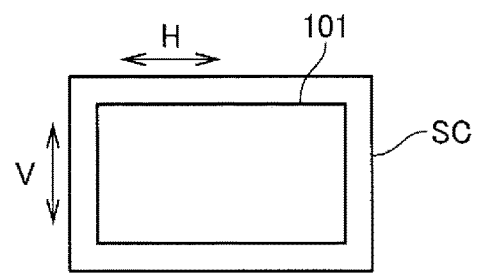

In the example of FIG. 2(a), the projector 1 projects an image from the front of the plane screen SC. In this example, as illustrated in FIG. 2(d), a projected image 101 on the screen SC is a rectangle shape not having distortion.

Figure 2B:
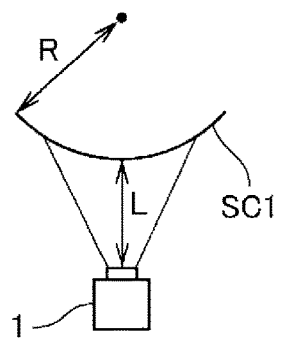
Figure 2E:
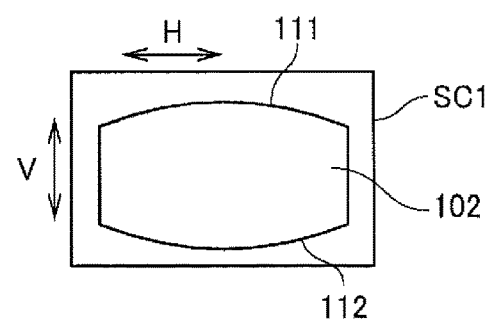

As illustrated in FIG. 2(b), when the image is projected on the screen SC1 constituting a convex curved surface in the projector 1 side, the projected image 102 becomes a shape that is convex in the vertical direction as illustrated in FIG. 2(e). The upper side 111 of the projected image 102 is a curve which is convex upward, and the lower side 112 is a curve which is convex downward. Left and right sides of the projected image 102 are approximately straight.

Figure 2C:
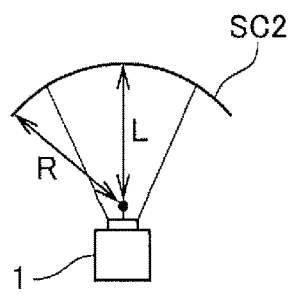
Figure 2F:
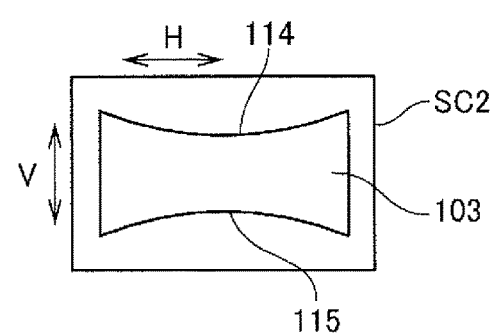

In addition, as illustrated in FIG. 2(c), when an image is projected on the screen SC2 constituting a concave curved surface in the projector 1 side, the projected image 103 becomes a shape that is concave in the vertical direction as illustrated in FIG. 2(f). The upper side 114 of the projected image 103 is a curve which is convex downward, and the lower side 115 is a curve which is concave upward. Left and right sides of the projected image 103 are approximately straight.

The degree of bending of the upper side 111 and the lower side 112 in the projected image 102, and the upper side 114 and a lower side 115 in the projected image 103 is changed by the degree of the curvature of the screens SC1 and SC2 and a projection distance from the projector 1. The degree of the curvature of the screens SC1 and SC2 can be represented by the radius illustrated as the symbol R in FIGS. 2(b) and 2(c). The radius R indicates the radius of a bottom surface in a case where the screen SC1 is a cylindrical surface. The cylindrical surface refers to a curved surface having the same curve as that of the side surface of the cylinder in which a circle or ellipse becomes a bottom surface. In the embodiment, the screens SC1 and SC2 are considered as the cylindrical surface in which the circle becomes the bottom surface. In addition, a distance L is a distance from the projection optical system 13 (more specifically, position of lens of projection optical system 13) of the projector 1 up to the screens SC1 and SC2.

In the embodiment, as one parameter of the geometric correction by the image processing unit 25, R/L is used. In addition, since a bending direction of the screen SC1 of FIG. 2(b) is the reverse of that of the screen SC2 of FIG. 2(c), the R/L is distinguished by a positive value and a negative valve. That is, the R/L with respect to the convex surface in the projector 1 side is set as the negative value as in the screen SC1, and the R/L with respect to the concave surface in the projector 1 side is set as the positive value as in the screen SC2.

Accordingly, in any one of FIG. 2(b) and FIG. 2(c), a bent amount of the upper sides 111 and 114, and the lower sides 112 and 115 becomes small, as an absolute value (hereinafter, |R/L|) of the R/L is great. In addition, the bent amount of the upper sides 111 and 114, and the lower sides 112 and 115 becomes great, as a value of |R/L| is small. In other words, when the projected image is corrected to bend the upper sides 111 and 114, and the lower sides 112 and 115 in a side opposite to distortion, corresponding to the value of |R/L|, the distortion can be offset. In addition, the direction of the bent amount is specified according to the value of the R/L being positive or negative. Accordingly, in the embodiment, the projector 1 performs the geometric correction processing, based on the value of the R/L by inputting the value of the R/L, by the user interface 120 described below. In addition, in a case of projecting on the plane screen SC, the R/L is set with a specific value (0 in the embodiment) for identification, in order to distinguish from a case of the curved surface such as the screens SC1 and SC2.

FIG. 3 illustrates diagrams illustrating an example of the distortion of a projected image to be a target of geometric correction processing. FIG. 3(a) is a schematic side view illustrating a tilt angle of the projector 1. FIGS. 3(b) to 3(d) illustrate an example of the projected image, and illustrate the projected image on the screen SC2 that is the concave curved surface in the projector 1 side as illustrated in FIG. 2(c), here.

Figure 3A:
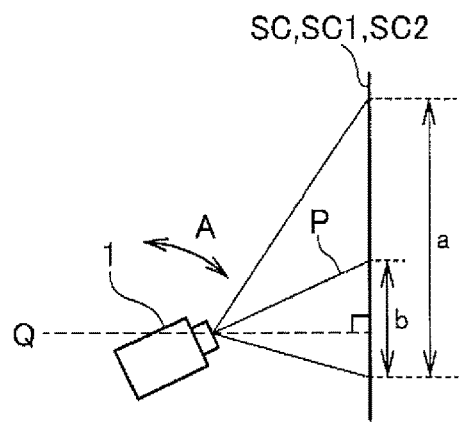
FIG. 3 illustrates diagrams illustrating an example of the distortion of a projected image to be the target of geometric correction processing.

In a case where an optical axis P of the projector 1 is inclined with respect to the screen SC as illustrated in FIG. 3(a), the trapezoidal distortion is generated if the plane screen SC is used. In addition, in a case where the screens SC1 and SC2 of curved surface are used, difference between the size of the bending of the upper side and the size of the bending of the lower side of the projected image is generated. In the embodiment, as a parameter indicating the inclination degree of the projector 1, a parameter b/a obtained from the distances a and b illustrated in the drawing is used. The a is the entirety of a range in which the projection light (image light) of the projection unit 10 is radiated, and the b indicates a lower portion than an optical axis of the projection unit 10. In the projector 1, the lengths a and b illustrated in FIG. 3(a) and a ratio of the lengths a and b are set as an indicator of the geometric correction. The a is a length of the entirety of an image projection range of the projector 1 in the longitudinal direction (predetermined direction), and the b is a length from a lower end of the image projection range up to an intersection point of the optical axis P and the screen SC in the longitudinal direction (predetermined direction).

In a case where the projector 1 projects an image to face directly the screens SC, SC1, and SC2, and the optical axis P is paralleled with a perpendicular line Q of the screens SC, SC1, and SC2, the optical axis P is positioned at the center of the projection range, and the b becomes half of the a and the b/a=½. When the projector 1 is inclined in a direction illustrated as the symbol A in the drawing with respect to the screens SC, SC1, and SC2, the ratio of the a and the b is changed. As illustrated in FIG. 3(a), the slope of the projector 1 related to the a and the b is an elevation angle, and, hereinafter, referred to as a tilt angle. When the tilt angle is upward, the ratio of the b with respect to the a decreases and the value of the b/a is downward. In addition, when the tilt angle decreases, the ratio of the b with respect to the a increases and the value of the b/a increases.

Figure 3B:
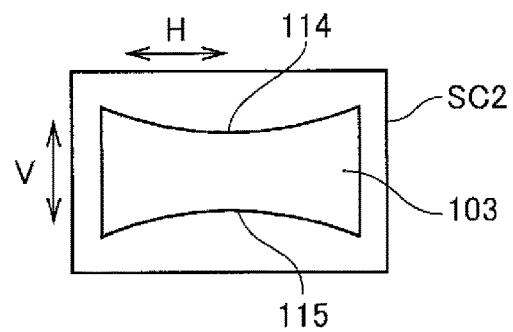

FIG. 3(b) illustrates the projected image 103 in a case where the tilt angle is zero, that is, the projector 1 is positioned to face directly the screen SC2, and the optical axis P is in parallel with the perpendicular line Q of the screen SC2. In this example, the b/a=½. In FIG. 3(b), the degree of bending of the upper side 114 and the degree of bending of the lower side 115 of the projected image 103 are approximately equal.

Figure 3C:
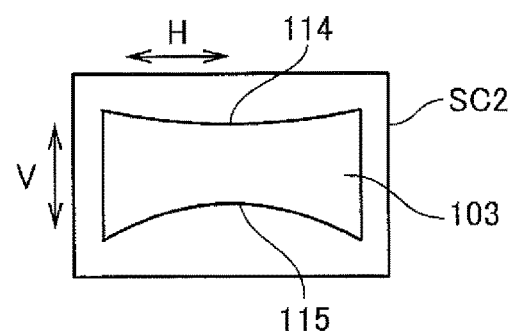
Figure 3D:
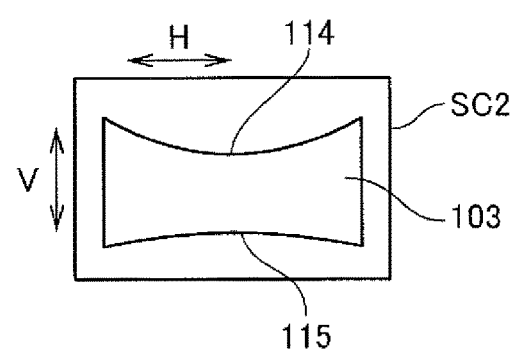

FIG. 3(c) illustrates an example where the tilt angle is downward and the b/a>½. In FIG. 3(c), the bending of the upper side 114 of the projected image 103 is small, and the bending of the lower side 115 is great. In addition, FIG. 3(d) illustrates an example where the tilt angle is upward and the b/a<½. In FIG. 3(d), the bending of the upper side 114 of the projected image 103 is great, and the bending of the lower side 115 is small. In a case where an image is projected on the screen SC1, the upper side 111 and the lower side 112 become curves opposite to FIGS. 3(b), 3(c), and 3(d).

However, the ratio of the size of the bending of the upper side 111 and the size of the bending of the lower side 112 is the same as the above.

As described above, the value of the b/a can be used as an indicator different from that of the bending of the upper side 114 and the lower side 115. The difference of the bent amount may be referred to as the deviation of the deformation amount.

Accordingly, in the embodiment, the projector 1 performs the geometric correction processing based on the value of the b/a by inputting the value of the b/a, by the user interface 120 described below.

Figure 4:
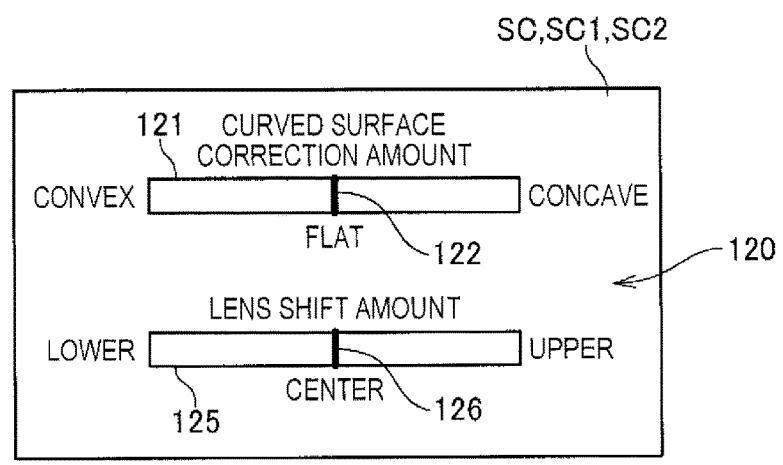
FIG. 4 is a diagram illustrating an example of a user interface.

FIG. 4 is a diagram illustrating an example of a user interface provided to the user by the projector 1 of the embodiment.

The user interface 120 illustrated in FIG. 4 is projected on the screens SC, SC1, and SC2 by the projection unit 10. The user interface 120 includes a slide bar display unit 121 (first user interface) that designates the R/L, and a slide bar display unit 125 (second user interface) that designates the b/a.

By an operation of the remote controller 5 or the operation panel 51, it is possible to move a bar 122 in the lateral direction in the drawing of the slide bar display unit 121. By moving the bar 122, it is possible to indicate the deformation of the projected image relating to a curvature of the screens SC1 and SC2. As illustrated by "convex", the left side of the slide bar display unit 121 instructs deformation of a side in which the projected image bulges. For example, the instruction is an instruction for deforming the projected image to a shape illustrated in FIG. 2(*e*), and changes the value of the R/L into a negative direction. Since the value of the R/L becomes great in the negative direction as the bar 122 is shifted to the left side, great deformation is generated in a direction in which the upper side and lower side of the projected image become a convex shape (bulge) toward outside.

As illustrated by "concave", the right side of the slide bar display unit 121 instructs the deformation of the side in which the upper side and lower side of the projected image become concave. For example, the instruction is an instruction for deforming the projected image to a shape illustrated in FIG. 2(*f*), and changes the value of the R/L in the negative direction. Since the value of the R/L becomes great in the positive direction as the bar 122 is shifted to the right side, great deformation is generated in a direction in which the upper side and lower side of the projected image become the convex shape (fit) inside.

Here, the position of the bar 122 in the slide bar display unit 121 may correspond to the value of the R/L, and may correspond to the direction in which the value of the R/L is changed and a change amount. That is, the position of the bar 122 may indicate an absolute value of the R/L, and the position of the bar 122 may indicate a relative value with respect to a current value of the R/L. In this case, in a case where the bar 122 is in the center position, the value of the R/L is not changed.

In addition, in the slide bar display unit 125, by an operation of the remote controller 5 or the operation panel 51, it is possible to move a bar 126 in the lateral direction in the drawing. By moving the bar 126, it is possible to instruct the deformation of the projected image relating to the tilt angle of the projector 1. That is, a user can instruct deviation of the deformation of the upper side and lower side of the projected image, by an operation for moving the bar 126.

As illustrated by "lower", the left side of the slide bar display unit 125 instructs the same deformation as that of a case where the main body of the projector 1 is downward. When the tilt angle of the main body of the projector 1 is downward, the projected image is deformed to a shape illustrated in FIG. 3(*c*). That is, an instruction for moving the bar 126 to the left side corresponds to an instruction of the deformation in which the bending of the lower side of the projected image increases, and the value of the b/a becomes great by the instruction. Accordingly, as the bar 126 is shifted to the left side, the bending of the upper side of the projected image is deformed to be small, and the bending of the lower side is deformed to be great.

Meanwhile, as illustrated by "upper", the right side of the slide bar display unit 125 instructs the same deformation as that of the case where the main body of the projector 1 is upward. When the tilt angle of the main body of the projector 1 is upward, the projected image is deformed to a shape illustrated in FIG. 3(*d*). That is, an instruction for moving the bar 126 to the right side corresponds to an instruction of the deformation for increasing the bending of the upper side of the projected image, and the value of the b/a becomes small by the instruction. Accordingly, as the bar 126 is shifted to the right side, the bending of the lower side of the projected image is deformed to be small, and the bending of the upper side is deformed to be great.

In the user interface 120, the deformation in the vertical direction (predetermined direction) in the drawing of the projected image can be controlled by moving two bars 122 and 126 in two slide bar display units 121 and 125. It is possible to instruct the deformation of the projected image, by a simply intuitive operation, compared to a case where the deformation of the projected image is designated, by designating the position of the representative point set in the projected image one by one in the related art.

Figure 5:
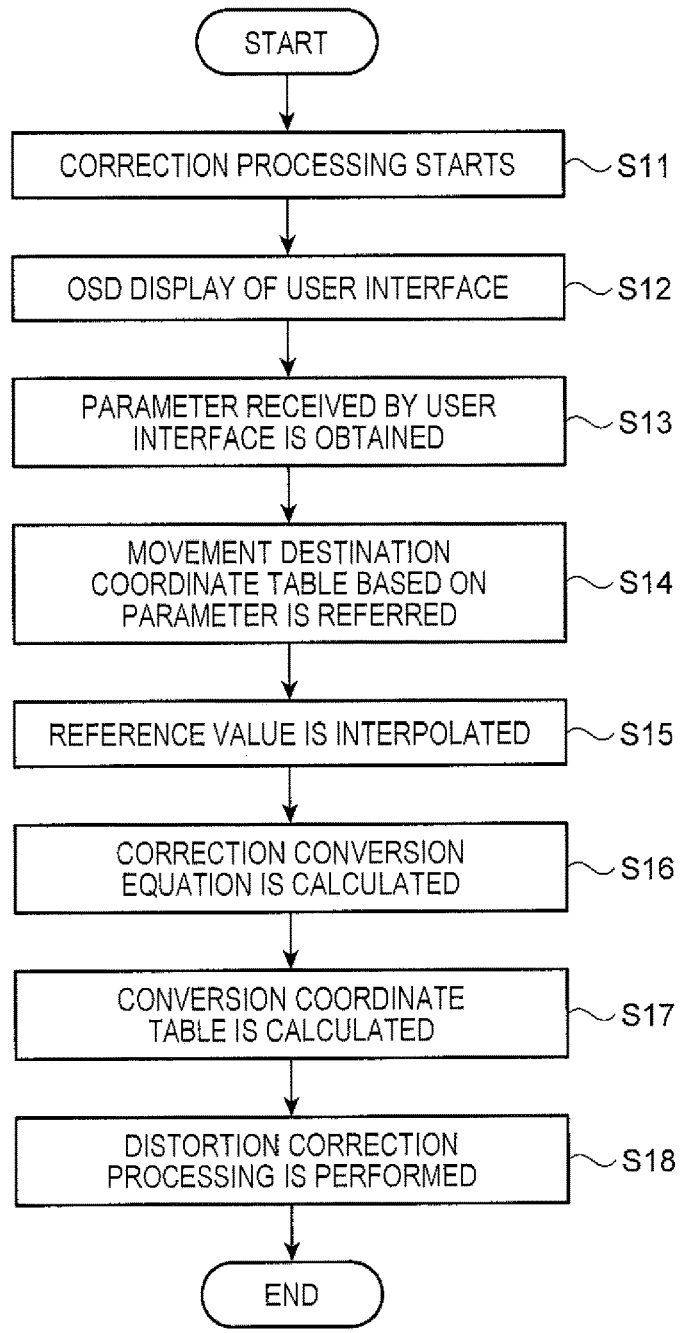
FIG. 5 is a flowchart illustrating an operation of the projector.

FIG. 5 is a flowchart illustrating an operation of the projector 1, and particularly, illustrates an operation relating to the geometric correction processing of the projected image.

The control unit 30 starts the geometric correction processing in accordance with an operation of the remote controller 5 or the operation panel 51 (step S11). First, the correction control unit 32 instructs OSD display for displaying the user interface 120 (FIG. 4) with respect to the OSD processing unit 251, and the OSD processing unit 251 reads the OSD data 541, and projects the user interface 120 (step S12).

In a state where the user interface 120 is projected, when a user operates the remote controller 5 or the operation panel 51 by using the slide bar display units 121 and 125, the correction control unit 32 obtains parameters input by an operation of the user (step S13). In the embodiment, the parameters obtained by the correction control unit 32 are the R/L determined based on the position of the bar 122 on the slide bar display unit 121, and the b/a determined based on the position of the bar 126 in the slide bar display unit 125.

The correction control unit 32 transfers the obtained parameter to the correction calculating unit 33. The correction calculating unit 33 refers to the movement destination coordinate table 542 stored in the memory unit 54, based on the parameter (step S14).

Here, the movement destination coordinate table 542 will be described.

Figure 6:
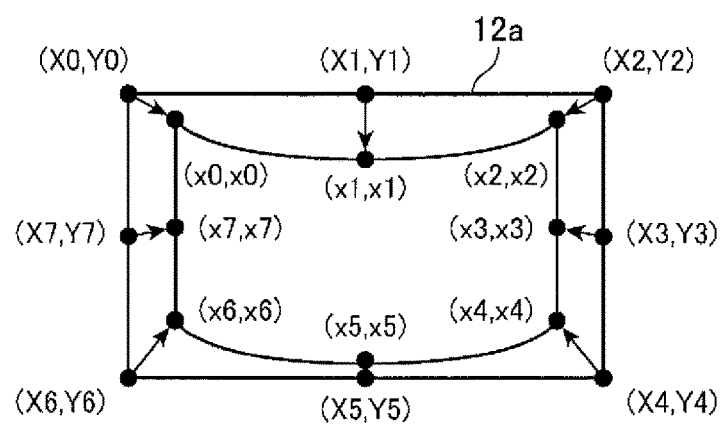
FIG. 6 is an explanatory diagram of the geometric correction processing.

FIG. 6 is an explanatory diagram of the geometric correction processing, and illustrates a state of coordinate conversion by exemplifying, as an example, a case in which the eight representative points are provided in the projected image. In addition, FIG. 7 is a diagram illustrating a configuration example of the movement destination coordinate table 542 determining the movement destination coordinates, with respect to the eight representative points of FIG. 6.

In an example of FIG. 6, eight representative points (X0, Y0), (X1, Y1), (X2, Y2), (X3, Y3), (X4, Y4), (X5, Y5), (X6, Y6), and (X7, Y7) are set with respect to the projected image. The eight representative points include four peak points of the projected image of a rectangle shape and four points between peak points. More specifically, the representative points (X0, Y0), (X2, Y2), (X4, Y4), and (X6, Y6) correspond to an apex of upper left, an apex of upper right, an apex of lower right, and an apex of lower left of the projected image of the rectangle shape, respectively. In addition, the representative point (X1, Y1) is between the apex of upper left (X0, Y0) and the apex of upper right (X2, Y2), and on the upper side of the projected image. The representative point (X3, Y3) is between the apex of upper right (X2, Y2) and the apex of lower right (X4, Y4), and on the right side of the projected image. The representative point (X5, Y5) is between the apex of lower right (X4, Y4) and the apex of lower left (X6, Y6), and on the lower side of the projected image. The representative point (X7, Y7) is between the apex of lower left (X6, Y6) and the apex of upper left (X0, Y0), and on the left side of the projected image. In the embodiment, each of the representative points (X1, Y1), (X3, Y3), (X5, Y5), and (X7, Y7) is set between two peak points. However, the position of the representative point is not limited thereto. In addition, in the embodiment, the number of the representative point is eight points. However, the number of the representative point is not limited thereto. FIG. 6 illustrates a state in which an image drawn in a pixel region 12*a* is converted in the liquid crystal panel of the light modulation device 12, and coordinates before the movement and after the movement of each point are coordinates in the pixel region 12*a*.

The geometric correction processing performed by the projector 1 is processing for deforming the image displayed in the pixel region 12*a*, and, specifically, processing for converting coordinates of the pixel constituting the image before deformation into another coordinates. Through the conversion, the coordinates of the representative points are converted into (x0, y0), (x1, y1), (x2, y2), (x3, y3), (x4, y4), (x5, y5), (x6, y6), and (x7, y7).

The movement destination coordinate table 542 is a table for determining coordinates of the movement destinations of the representative points (X0, Y0), (X1, Y1), (X2, Y2), (X3, Y3), (X4, Y4), (X5, Y5), (X6, Y6), and (X7, Y7), by corresponding to the value of the parameter R/L. In the movement destination coordinate table 542, the movement destination coordinates of eight points corresponding to a discretized R/L are calculated in advance and set. In an example of FIG. 6, eight point coordinates of the R/L are described as (x0 (R/L), y0 (R/L)) to (x7 (R/L), y7 (R/L)).

The movement destination coordinate table 542 is provided for every value of the b/a, and stored in the memory unit 54. In the embodiment, the movement destination coordinate table corresponding to each of a:b=1:9, a:b=2:8, a:b=3:7, a:b=4:6, a:b=5:5, a:b=6:4, a:b=7:3, a:b=8:2, and a:b=9:1 is stored in the memory unit 54. For example, each of the movement destination coordinate table 542 illustrated in FIG. 7 corresponds to a:b=5:5 (b/a=1), and the movement destination coordinate table 542 corresponding to a value of another b/a is stored in the memory unit 54.

In step S14, the correction calculating unit 33 reads the movement destination coordinate table 542 corresponding to the b/a obtained by the correction control unit 32, and obtains the movement destination coordinates that are set by corresponding to the coordinates before the movement of the representative point in the movement destination coordinate table 542.

Here, the correction calculating unit 33 not only corresponds to the value of the b/a obtained by the correction control unit 32, but also reads the movement destination coordinate table 542 corresponding to a value close to the obtained b/a. Furthermore, the correction calculating unit 33 obtains the movement destination coordinates corresponding to R/L of another value close to the R/L, in addition to the value of the R/L obtained by the correction control unit 32. For example, the correction calculating unit 33 obtains the movement destination coordinates corresponding to the four values of the R/L close to the R/L obtained by the correction control unit 32, by referring four movement destination coordinate tables 542 close to the b/a obtained by the correction control unit 32. In this case, four sets of the obtained movement destination coordinates exist.

The correction calculating unit 33 calculates the movement destination coordinates of actual eight representative points, by performing calculation for interpolating the obtained movement destination coordinates of four sets (step S15).

Next, the correction calculating unit 33 obtains a conversion equation, based on the calculated movement destination coordinates of eight points (step S16). As the conversion equation, movement original coordinates are set as (X, Y), and the movement destination coordinates are set as (x, y), and then it is possible to use the following quadratic equation of xy (following equations (1) and (2)) as an approximate equation.

$$x = A \cdot X^2 Y + B \cdot XY^2 + C \cdot XY + D \cdot X^2 + E \cdot Y^2 + F \cdot X + G \cdot Y + H \quad (1)$$

$$y = I \cdot X^2 Y + J \cdot XY^2 + K \cdot XY + L \cdot X^2 + M \cdot Y^2 + N \cdot X + O \cdot Y + P \quad (2)$$

Correction parameters A to P of above equations (1) and (2) can be obtained by solving the simultaneous equations, by substituting the movement destination coordinates of eight points to (x, y), and by substituting the coordinates before correction to (X, Y).

The correction calculating unit 33 calculates the movement destination coordinates of each pixel after deformation based on the obtained conversion equation (step S17). Here, in a case where the image size of a processing target of the geometric correction processing is great, when the movement destination coordinates with respect to all pixel coordinates are obtained, a calculation time and a data amount become great. In this case, the movement destination coordinates may be obtained only with respect to the pixel coordinates to be representative (for example, lattice point in which image of processing target is partitioned by 16×16 pixels). The correction calculating unit 33 creates a conversion coordinate table by creating the obtained movement destination coordinates to a table, and outputs the created table to the correction unit 252.

The correction unit 252 performs the geometric correction processing, based on the conversion coordinate table generated by the correction calculating unit 33 (step S18). In step S18, the correction unit 252 converts coordinates of each pixel constituting the image of the processing target, and generates a corrected image, by performing processing such as filter interpolation and the like.

Processing of steps S11 to S18 of the FIG. 5 can be repeatedly performed whenever an operation of the user interface 120 is performed. Specifically, after the user interface 120 is projected in step S12, whenever the position of the bars 122 and 126 is changed in the slide bar display units 121 and 125, processing of steps S13 to S18 are performed. The control unit 30 performs steps S13 to S18 based on the position of the bars 122 and 126 after the movement when the bars 122 and 126 are moved, and then the control unit 30 waits until the bars 122 and 126 are moved. In this method, whenever the user operates the user interface 120, the projected image is deformed, and the operation is performed again while viewing the shape of the projected image after the deformation. Therefore, the user can perform the geometric correction to the desired shape, by gradually deforming the image through the operation of the user interface 120 while viewing the shape of the projected image. After that, when the instruction for finally determining the shape is input by the operation of the remote controller 5 or the operation panel 51, the correction control unit 32 completes the geometric correction processing, and the table in which coordinates are converted by the correction unit 252 is determined.

After that, since the correction unit 252 converts constant coordinates by using the determined table, the projected image holds the shape in which the geometric correction is performed.

In a case where an image is projected on the screens SC1 and SC2 of the curved surface as the embodiment, if the ratio the R/L and a lens shift amount are constant, the shape of the projected image becomes similar even if the value of R or L is changed. For example, in a case where R=10 m and L=5 m, and R=20 m and L=10 m, the ratio R/L of all of the cases is 0.5 and equal to one another. At this time, if the lens shift amount is constant, a case where R=10 m and L=5 m of the shape of the image projected on the screens SC1 and SC2 of curved surface is similar to a case where R=20 m and L=10 m. Therefore, the shape of the projected image is uniquely determined with respect to a combination of a predetermined ratio R/L and a predetermined lens shift amount. Accordingly, if coordinates of eight points which can project the image in which the distortion is corrected correspond to a combination of a predetermined ratio R/L and a predetermined lens shift amount, it is possible to perform appropriate correction even in a case where R or L is changed.

Figure 9A:
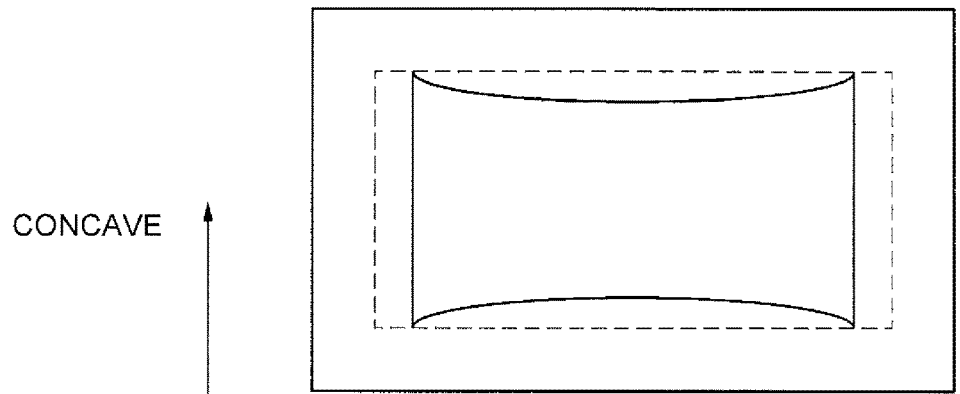
FIG. 9 is a diagram illustrating shapes of an image formed on a liquid crystal panel of a light modulation device.
Figure 9B:
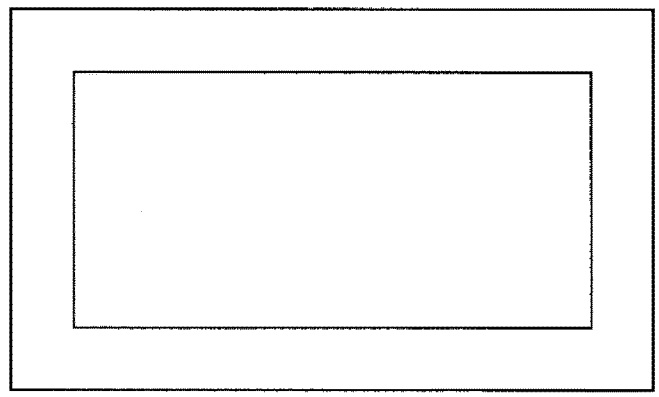
Figure 9C:
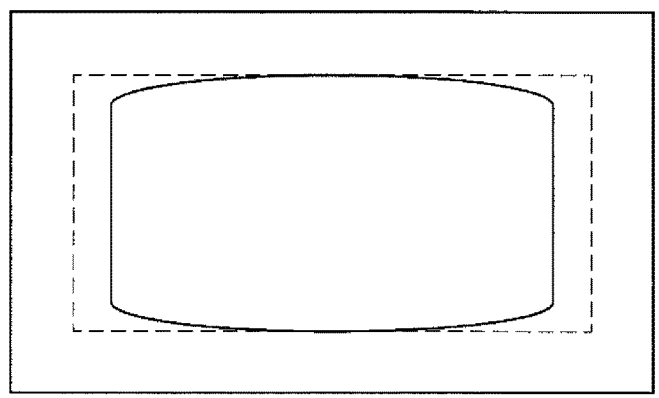

FIG. 9 illustrates the shape change of the image formed on the liquid crystal panel of the light modulation device 12, in a case where the R/L is changed while setting the lens shift amount to be constant. FIG. 9(B) illustrates a shape of an image formed on the liquid crystal panel of the light modulation device 12 when an image is projected on the plane screen SC. In addition, FIG. 9(A) illustrates a shape of an image formed on the liquid crystal panel when an image is projected on the screen SC1 of the concave surface, and FIG. 9(C) illustrates a shape of an image formed on the liquid crystal panel when an image is projected on the screen SC2 of the convex surface. Even in each case, the image projected on the screens SC, SC1, and SC2 is corrected to an appropriate shape.

When the image is projected on the screen SC1 of the concave surface as illustrated in FIG. 9(A), since the upper side and lower side of the image formed on the liquid crystal panel become concave, a width of the vertical direction becomes a shorter width than that of a state before the correction in the vicinity of the center of the image in the horizontal direction. In addition, when an image is projected on the screen SC2 of the convex surface as illustrated in FIG. 9(C), since the upper side and lower side of the image formed on the liquid crystal panel become convex, a width in the vertical direction becomes a shorter width than that of the state before the correction in both ends of the image in the horizontal direction. As described above, in a case where an image is projected on the screen SC1 of the concave surface or the screen SC2 of the convex surface, the width of the projected image in the vertical direction becomes a shorter width than the width of the uncorrected projected image in the vertical direction, along with the correction of distortion of the upper side and lower side of the projected image. Here, when the width of the projected image in the horizontal direction becomes equal to the width of the uncorrected projected image in the horizontal direction, a horizontal projected image of which the width in the vertical direction is shrunk compared to the uncorrected projected image, that is, the projected image having an aspect ratio different from that of the uncorrected projected image is projected on the screen SC1 or SC2. Therefore, in order to maintain the aspect ratio before and after the correction, in FIGS. 9(A) and (C), the width in the horizontal direction is shortened compared to the state being uncorrected. The parameters of coordinates of eight points illustrated in FIG. 9 are set to appropriate values, so as to be able to maintain the aspect ratio of the projected image at a desired value.

As described above, the projector 1 according to the embodiment to which the invention is applied includes the projection unit 10 that projects an image on the screens SC, SC1, and SC2, and the correction unit 252 that performs the geometric correction of the projected image based on the deformation amount in a predetermined direction and the deviation of the deformation amount in the predetermined direction, with respect to the projection target. Therefore, if the user designates the deformation amount and the deviation of the deformation amount that are one-dimensional amount or number, the geometric correction of the projected image is performed. The user can simply designate a desired method of geometric correction by an intuitive operation.

In addition, the user can designate the deformation amount in the predetermined direction and the deviation of the deformation amount in the predetermined direction with respect to the projection target, by an operation of the remote controller 5 and the operation panel 51 as the operation unit included in the projector 1.

In addition, the projector 1 projects the user interface 120 relating to the geometric correction of the projected image, by the projection unit 10. The user can designate the deformation amount in the predetermined direction and the deviation of the deformation amount in the predetermined direction with respect to the projection target by using the user interface 120, and can designate the method of the geometric correction of the projected image. Since the deformation amount and the deviation of the deformation amount designated in the user interface 120 are one-dimensional or number, correspondence between the shape change and the operation content of the projected image is clear, and easy to understand. Accordingly, it is possible to perform the intuitive operation, and simply designate the desired method of the geometric correction.

In addition, the user interface 120 of the projector 1 includes the slide bar display unit 121 that instructs the deformation amount in the predetermined direction with respect to the projection target and the slide bar display unit 125 that instructs the deviation of the deformation amount in the predetermined direction. The user can designate the R/L indicating the deformation amount and the b/a indicating the deviation of the deformation amount in the predetermined direction, by using the user interface 120, and designate the method of the geometric correction of the projected image. In this configuration, the geometric correction on the projected image is performed based on an operation for moving the bars 122 and 126 in the user interface 120, and correspondence between the shape change and the operation content of the projected image is clear, and easy to understand. Accordingly, it is possible to perform the intuitive operation, and simply designate the desired method of the geometric correction.

As in the embodiment, in a case where the projection target is a curved surface and the projected image is distorted due to the curved surface, the correction unit 252 deforms the projected image to be convex or concave in the predetermined direction of the projection target and whereby the user is allowed to correct distortion with an intuitive and easy operation.

In addition, since the slide bar display units 121 and 125 are a slide bar type interface, it is possible to designate the method of the geometric correction by a more intuitive and easy operation.

Furthermore, in the above example, the user interface 120 may perform the geometric correction processing for deforming the projected image, in a second direction perpendicular to the predetermined direction, that is, in a horizontal direction illustrated as a symbol H in FIGS. 2(*d*) to 2(*f*). In this case, for example, a third slide bar display unit may be disposed in the user interface 120, as a third user interface for instructing the deformation amount in the second direction. In this case, since the correction unit 252 performs the geometric correction in the second direction according to an operation of the third user interface, the method of the geometric correction can be also designated by the intuitive and easy operation with respect to the second direction perpendicular to the predetermined direction.

In addition, the projector 1 according to the embodiment includes the correction unit 252 for correcting the projected image of the projection unit, based on the deformation amount in the predetermined direction (V) and the deviation of the deformation amount in the predetermined direction (V) with respect to the projection target. Therefore, since the geometric correction of the projected image is performed by designating the deformation amount and the deviation of the deformation amount that are one-dimensional amount or number, a user can simply designate the desired method of the geometric correction, by the intuitive operation.

In addition, by the control of the correction control unit 32 and the correction calculating unit 33 and processing of the correction unit 252, the projected image of the projection unit is corrected based on the distance L between the cylindrical surface in a case where the screens SC1 and SC2 that are the projection target are considered as the cylindrical surface and the projection unit, and the radius R of the bottom surface of the cylindrical surface. More specifically, the projected image is corrected based on the distance L and the radius R in a case where a side of the projection target opposite to the projector 1 is considered as a convex or concave cylindrical surface. Therefore, in a case where the distortion of the projected image due to the bending of the projection target using the projection target having the bending of the cylindrical surface shape is generated, it is possible to correct the distortion of the projected image by a simple operation.

Embodiments described above are merely examples of specific embodiments according to the invention, not intended to limit the invention, and it is also possible to apply the invention as a separate embodiment from the embodiment described above. In the embodiment, the user interface 120 for moving the bars 122 and 126 in the slide bar display units 121 and 125 is exemplified. However, the shape of the user interface 120 is not limited thereto. The user interface 120 may be the user interface which can designate the size of the R/L that is one-dimensional amount and the size of the b/a or designate the change of the size.

In addition, the user interface 120 is not limited to a case where the user interface 120 is overlapped with the projected image to be projected by the projector 1, and for example, the user interface 120 may be provided in an external device of the projector 1. This example is illustrated in FIG. 8 as a modification example.

Figure 8:
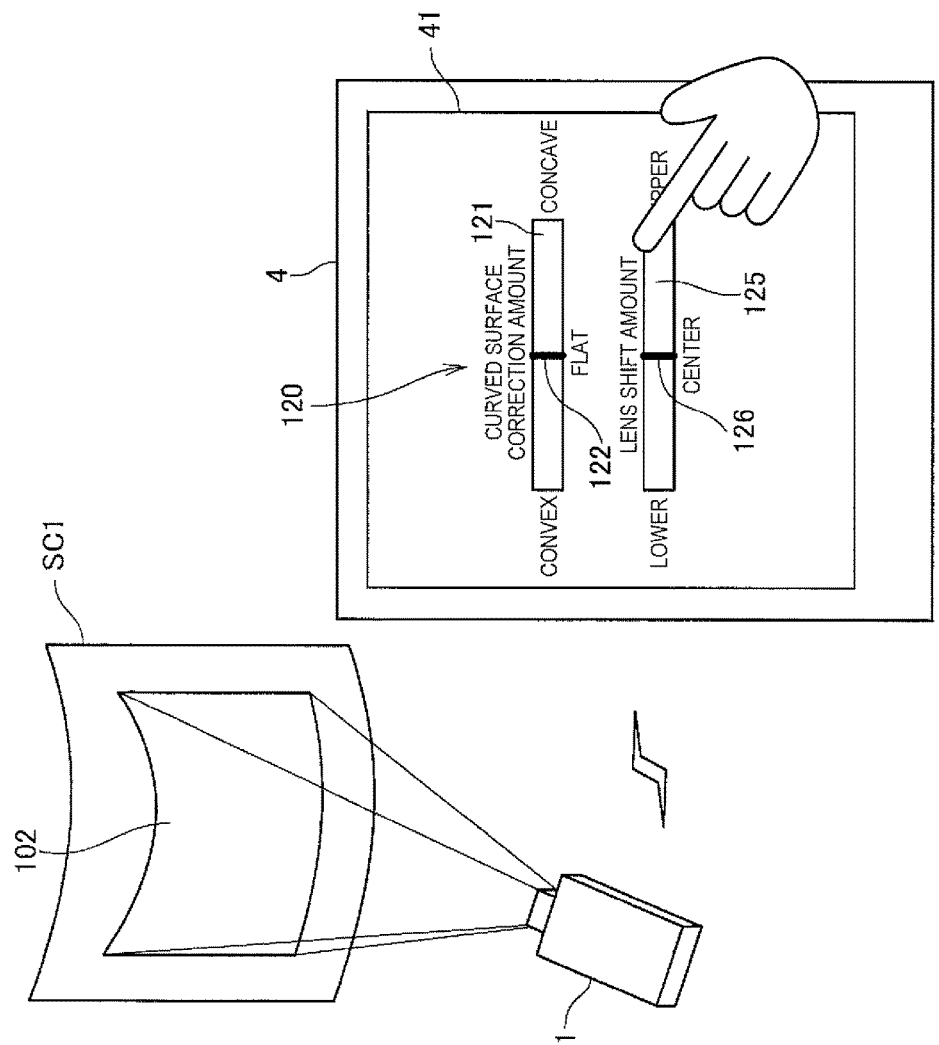
FIG. 8 is a schematic configuration diagram of a system of a modification example.

FIG. 8 illustrates an example where the user interface 120 is disposed on a display screen 41 of a portable terminal device 4 in a system in which the portable terminal device 4 is connected to the projector 1. In this example, the portable terminal device 4 performs wireless communication with the wireless communication unit 55 included in the projector 1.

The correction control unit 32 of the projector 1 generates image data for the portable terminal device 4 based on the OSD data 541 (FIG. 1), and transmits the generated data to the portable terminal device 4 in a case where the execution of the geometric correction is instructed. A control unit (not illustrated) of the portable terminal device 4 receives the image data from the projector 1, and displays the image data on the display screen 41. For example, the user interface 120 includes the slide bar display units 121 and 125, and can designate the R/L and the b/a by the operation of the bars 122 and 126, similar to the embodiment.

The portable terminal device 4 may be a portable electronic device such as a smartphone, a tablet computer, and the like, and may have at least a wireless communication function and the display screen 41. In these portable electronic devices, the display screen 41 functions as a touch panel that detects a touch operation. Therefore, in a state where the user interface 120 is displayed on the display screen 41, the touch operation by the hand of a user is performed on the display screen 41, and the bars 122 and 126 can be operated.

In this modification example, the portable terminal device 4 detects a movement amount or position of the bars 122 and 126 by the touch operation such that data in which coordinate data thereof or coordinates are converted into the value of the R/L and the b/a are transmitted to the projector 1. In this case, the projector 1 can obtain the same effect as that of the embodiment, by processing data received from the portable terminal device 4 in the same processing as that of data or the like detected by the operation of the remote controller 5 or the operation panel 51.

In addition, in the portable terminal device 4, the function for instructing the geometric correction processing of the projector 1 may be mounted as an application. In this case, it is not necessary to transmit data for displaying the user interface 120 from the projector 1 to the portable terminal device 4. The application may start, the user interface 120 may be displayed, and control data may be transmitted to the projector 1 according to the operation with respect to the user interface 120, in the portable terminal device 4.

Furthermore, a configuration in which the portable terminal device 4 transmits the image data to the projector 1 such that the projector 1 receives the image data, and the image based on the received image data is projected on the screens SC, SC1, and SC2, may be implemented. In this case, the portable terminal device 4 may perform the entirety or a part of pieces of processing by the correction control unit 32, the correction calculating unit 33, and the image processing unit 25 described above.

In addition, in the embodiment, a configuration using three transmissive liquid crystal panels corresponding to each color of RGB is exemplified, as the light modulation device 12 that demodulates light emitted by a light source. However, the invention is not limited thereto. For example, a configuration using three reflective liquid crystal panels may be implemented, and a configuration using a method combining one liquid crystal panel and a color wheel may be used. Alternatively, a configuration of a method using three digital mirror devices (DMD), a DMD method combining one digital mirror device and the color wheel, or the like may be implemented. In a case where only one liquid crystal panel or DMD is used as a light modulation device, a member corresponding to a combining optical system such as a cross dichroic prism and the like is unnecessary. In addition, if the device is the light modulation device capable of modulating light emitted by the light source, in addition to the liquid crystal panel and the DMD, the device can be adopted without any problems.

In addition, in the embodiment, the projector 1 of a front projection type that projects an image from the front of the screens SC, SC1, and SC2 is represented as an example. However, the invention is not limited thereto. For example, it is possible to adopt a rear projection type projector that projects an image from the rear side of the screen SC as the display device. In addition, it is possible to use a liquid crystal display, an organic electro luminescence (EL) display, a plasma display, a cathode ray tube (CRT) display, a surface-conduction electron-emitter display (SED), or the like as the display device.

In addition, each functional unit illustrated in FIG. 1 illustrates a functional configuration, and a specific implementation is not particularly limited. That is, it is not necessary to be mounted a hardware individually corresponding to each functional unit, and it is also possible to adopt a configuration in which one processor realizes the functions of a plurality of functional units by executing programs. In addition, a part of the function realized by software in the embodiment may be realized by a hardware, or a part of the function realized by a hardware may be realized by software. Furthermore, a specific detail construction of another unit of the projector 1 can be also arbitrarily changed without departing from the scope of the invention.

The invention claimed is:

1. A projector comprising:
a projection unit that projects an image on a projection target; and
a processor programmed to:
receive a user input of a first one-dimensional amount or number as a designated deformation amount of the projected image in a predetermined direction, and a second one-dimensional amount or number as a designated deviation of the projected image; and
perform geometric correction on the projected image based on (i) the designated deformation amount in the predetermined direction and (ii) the designated deviation, with respect to the projection target, such that the first one-dimensional amount or number deforms the projected image symmetrically relative to a horizontal line that passes through the projected image, and the second one-dimensional amount or number deforms the projected image un-symmetrically relative to the horizontal line.

2. The projector according to claim 1, wherein the processor is further programmed to:
cause the projection unit to project one or more user interfaces for receiving the first one-dimensional amount or number as the designated deformation amount of the projected image in the predetermined direction, and the second one-dimensional amount or number as the designated deviation of the projected image.

3. The projector according to claim 2, wherein
the one or more user interfaces include a first user interface for instructing for the first one-dimensional amount or number, and a second user interface for instructing for the second one-dimensional amount or number.

4. The projector according to claim 3, wherein
at least one of the first user interface and the second user interface is a slide bar type user interface.

5. The projector according to claim 2, wherein:
the one or more user interfaces include a third user interface for instructing for a deformation amount in a second direction perpendicular to the predetermined direction; and
the processor is further programmed to: cause the projection unit to perform the geometric correction in the second direction, in response to an operation of the third user interface.

6. The projector according to claim 1, wherein the processor is further programmed to:
cause the projection unit to correct the projected image, based on (i) a distance between a cylindrical surface in a case where the projection target is considered as the cylindrical surface and the projection unit, and (ii) a radius of the cylindrical surface.

7. The projector according to claim 6, wherein the processor is further programmed to:
cause the projection unit to correct the projected image, based on (i) a distance between a convex or concave cylindrical surface that is considered a side of the projection target opposite to the projection unit and the projection unit, and (ii) a radius of the cylindrical surface.

8. The projector according to claim 1, wherein the processor is further programmed to:
perform correction in a second direction perpendicular to the predetermined direction, based on the deformation amount in the second direction.

9. The projector according to claim 8, wherein the processor is further programmed to:
cause the projection unit to correct the projected image in the second direction, based on a slope of an optical axis of the projection unit with respect to a horizontal direction.

10. A control method of a projector that projects an image on a projection target, comprising:
projecting an image on a projection target;
determining a first one-dimensional amount or number as a designated deformation amount of the projected image in a predetermined direction;
determining a second one-dimensional amount or number as a designated deviation of the projected image; and
causing the projection unit to perform geometric correction on the projected image based on (i) the designated deformation amount in the predetermined direction and (ii) the designated deviation, with respect to the projection target, such that the first one-dimensional amount or number deforms the projected image symmetrically relative to a horizontal line that passes through the projected image, and the second one-dimensional amount or number deforms the projected image un-symmetrically relative to the horizontal line.

11. The control method of a projector according to claim 10, wherein:
- determining the first one-dimensional amount or number includes receiving a user input of the first one-dimensional amount or number as the designated deformation amount of the projected image in the predetermined direction; and
- determining the second one-dimensional amount or number includes receiving a user input of the second one-dimensional amount or number as the designated deviation of the projected image.

12. A non-transitory computer readable medium comprising computer-executable instructions that, when executed by a computer, cause the computer to:
- control a projector to project an image on a projection target;
- receive a user input of a first one-dimensional amount or number as a designated deformation amount of the projected image in a predetermined direction, and a second one-dimensional amount or number as a designated deviation of the projected image; and
- perform geometric correction on the projected image based on (i) the designated deformation amount in the predetermined direction and (ii) the designated deviation, with respect to the projection target, such that the first one-dimensional amount or number deforms the projected image symmetrically relative to a horizontal line that passes through the projected image, and the second one-dimensional amount or number deforms the projected image un-symmetrically relative to the horizontal line.

* * * * *